United States Patent [19]

Hess

[11] Patent Number: 5,215,278
[45] Date of Patent: Jun. 1, 1993

[54] APPARATUS FOR LAYING TURF

[76] Inventor: Douglas S. Hess, 1362 Conneaut, Bowling Green, Ohio 43402

[21] Appl. No.: 801,533

[22] Filed: Dec. 2, 1991

[51] Int. Cl.$^5$ .................... A01B 45/00; B65H 16/00
[52] U.S. Cl. .................... 242/86.52; 172/20; 414/911
[58] Field of Search ............ 242/86.5, 86.3, 86.52, 242/55.1; 172/19, 818, 20; 111/901; 47/914; 414/911, 246

[56] References Cited

U.S. PATENT DOCUMENTS

| | | | |
|---|---|---|---|
| 3,982,711 | 9/1976 | Bradley et al. | 242/86.52 |
| 4,067,393 | 1/1978 | Szarkowski | 172/1 |
| 4,084,763 | 4/1978 | Zamboni | 414/911 |
| 4,149,640 | 4/1979 | White | 114/901 |
| 4,164,295 | 8/1979 | White | 414/786 |
| 4,354,556 | 10/1982 | Evans | 172/2 |
| 4,545,716 | 10/1985 | Pearce | 414/24.6 |
| 4,754,815 | 7/1988 | Brouwer et al. | 242/86.52 |
| 4,777,890 | 10/1988 | Raymond | 172/19 |
| 4,878,542 | 11/1989 | Brouwer et al. | 172/20 |
| 4,890,801 | 1/1990 | Brouwer | 172/20 |

FOREIGN PATENT DOCUMENTS

| | | |
|---|---|---|
| 0420689 | 4/1991 | European Pat. Off. |
| 1063672 | 8/1959 | Fed. Rep. of Germany ..... 242/86.6 |
| 1357939 | 6/1974 | United Kingdom .......... 242/86.5 R |

Primary Examiner—Daniel P. Stodola
Assistant Examiner—John F. Rouins
Attorney, Agent, or Firm—Marshall & Melhorn

[57] ABSTRACT

An apparatus for laying large rolls of turf, including a conveyor mounted on a frame for supporting a large roll of turf. The frame is supported by ground engaging wheels and includes a motor for imparting rotational movement to the ground engaging wheels for moving the frame and laying the turf. The rotation of the ground engaging wheels imparts movement to the conveyor to unwind the roll of turf such that the outer end of the roll of turf is guided from the rear of the conveyor to the ground. Hydraulic systems are included for raising and lowering the conveyor and for independently moving the conveyor to unwind additional turf.

18 Claims, 4 Drawing Sheets

APPARATUS FOR LAYING TURF

BACKGROUND OF THE INVENTION

The present invention relates generally to an apparatus for laying turf and, in particular, to an apparatus for laying large rolls of turf to produce a lawn.

Historically, turf (also commonly called sod) has been grown in nurseries, fields, and the like and has been cut into long rectangular strips for transportation to the desired location. The cut strips of turf are up to six feet long and weigh between forty and fifty pounds. After cutting, the turf is typically stored and transported on pallets either in flat strips or small rolls.

The laying of turf is generally very labor intensive and inefficient. The heavy rolls or strips of turf are lifted from a pallet by hand to the desired location. The turf is then unrolled and laid as closely as possible against the edge of the previously laid turf. The task of rolling, carrying, positioning, and unrolling strips of turf is time consuming, burdensome, and expensive.

There are numerous difficulties involved in laying turf by machine. Turf is an extremely difficult material with which to work, because it is heavy and yet has very little tensile strength. The tensile strength of the turf can also very greatly from one sample to another depending on the condition of the turf, such as its thickness, age, type of soil, moisture content, and variety of grass. Even within a single roll of turf, the characteristics of the turf can vary greatly because the top of the roll tends to dry out at a faster rate than the bottom portion of the roll. The turf also tends to stretch unevenly when it is being laid, forming unsightly buckles which must be removed. The turf may frequently break, interrupting the turf laying operation.

In recent years, turf harvesting machines have been developed to harvest rolls of turf up to forty-eight inches wide and over one hundred feet long. The use of such large rolls offers many potential benefits to both the turf layer and user. The user benefits from longer, wider turf with fewer seams, which in turn means less shrinkage, fewer weeds and crab grass, less curl, and a more acceptable appearance.

Cutting large rolls of turf and rolling them by machine also is efficient and economical. The amount of time and labor to initially cut and roll the turf is significantly reduced through the use of large rolls. Because of the size and weight of the turf harvested in large rolls, which often weigh over one thousand pounds, the large turf rolls must also be laid by machine.

As noted above, the turf is very difficult to work with and requires an accurate and reliable apparatus for laying the large turf rolls. The turf industry has a need for a new turf laying machine that is relatively small and maneuverable and able to lay the fragile turf accurately while reducing the likelihood of breaks and buckles in the turf when unwinding the roll.

SUMMARY OF THE INVENTION

The present invention concerns an apparatus for laying large rolls of turf. The principle object of the present invention is to provide an efficient and less strenuous means for laying turf. Another object of the present invention is to reduce the manpower required to lay turf by using the apparatus of the present invention to lay large rolls of turf.

In accordance with the present invention, there is provided a frame supported by a ground engaging means and connected to a drive means to move the frame for laying the turf. A roll of turf is rotatably supported on the frame by a conveyor or other means. A conveyor drive unwinds the roll of turf such that the turf is guided downwardly from the conveyor to the ground.

The conveyor means is typically an endless conveyor which frictionally engages the top of the ground engaging means. As the apparatus is moved along the ground, the conveyor is caused to move about space apart sprocket wheels to unwind the roll of turf. Hydraulic systems are provided for raising and lowering the conveyor and for driving the conveyor to unwind the turf independent of the movement of the ground engaging wheels which may be required when the strip of turf has broken; or to tighten the turf roll upon the occurrence of a buckle in the turf.

The apparatus may also include means to remove dirt and grass from the endless conveyor. It has been found that a plurality of teeth may be used to contact the surface of the endless conveyor to cause any collected dirt and grass to be removed therefrom.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
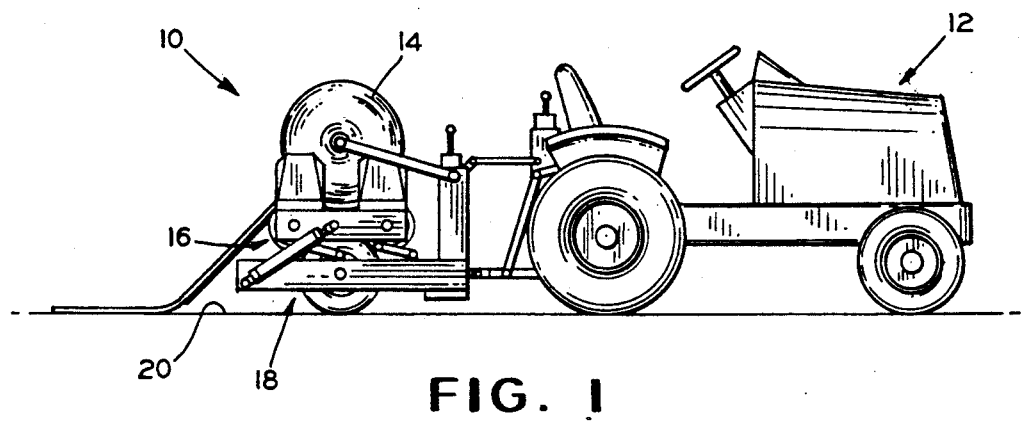
FIG. 1 is a side elevational view of the present invention connected to a pulling vehicle.

Reference is initially made to FIGS. 1 through 5, inclusive, which illustrate a turf laying machine, generally indicated by reference numeral 10 adapted to be pulled by means of a pulling vehicle 12 across the surface to which the turf is to be applied. The turf laying machine 10 supports a roll of turf 14 on a conveyor means 16 mounted on a frame 18.

The frame 18 of the turf laying machine 10 is a rectangular frame generally parallel to the ground 20. The frame 18 is formed from structural members, such as rectangular-shaped steel beams. The two side beams 22 and 24 of the frame 18 are parallel, spaced apart beams extending the full length of frame 18. A front cross-beam 26 and a rear cross-beam 28 are welded between the side beams 22 and 24 to form the base 30 of frame 18.

The frame 18 includes a plurality of support components mounted perpendicular to the base 30 at the front end of the frame 18. Side post 32 extends perpendicular from the front end of side beam 22. Side post 34 extends perpendicular from the front end of side beam 24. A center post 36 extends perpendicular from the upper surface of front cross-beam 26. An upper cross-beam 38 is positioned on the top of center post 36 and is welded to side posts 34 and 36.

Figure 2:
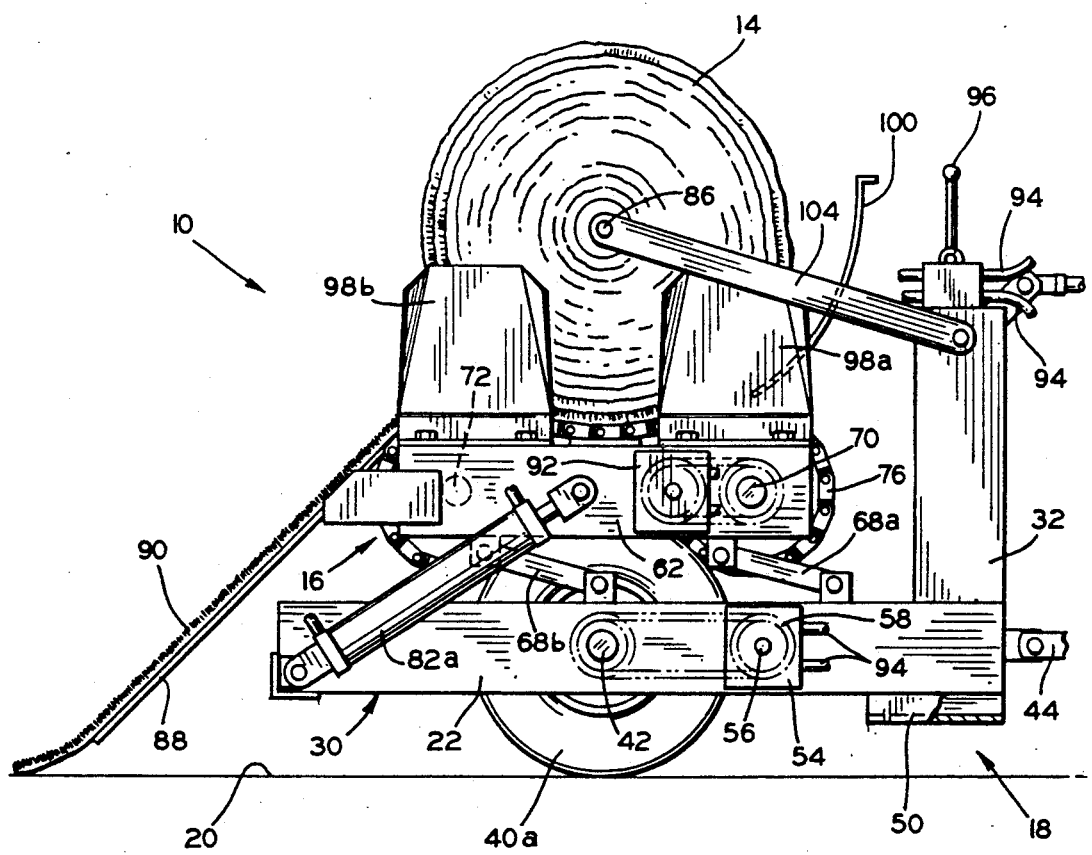
FIG. 2 is a side elevational view of the turf laying apparatus of FIG. 1.
Figure 3:
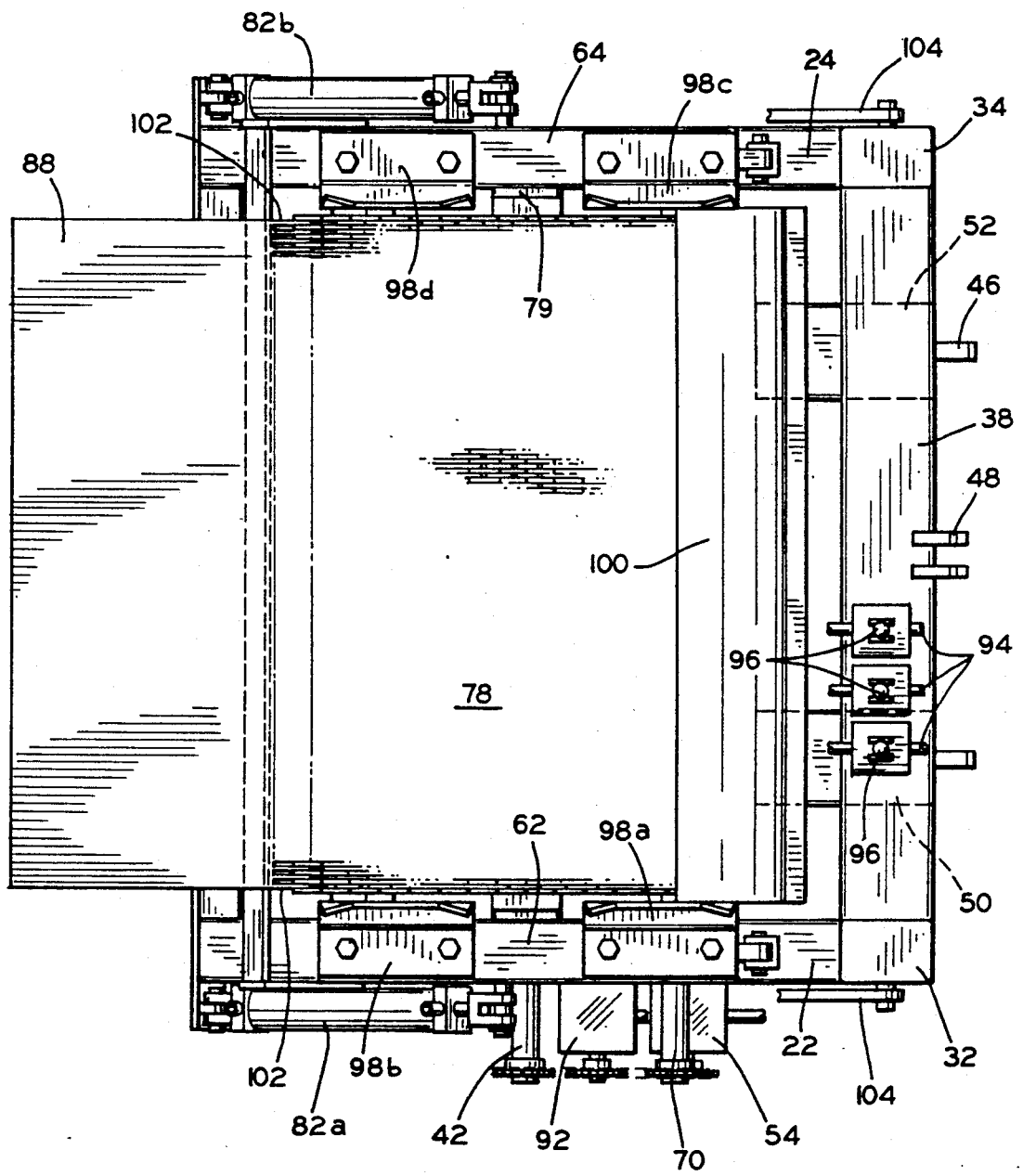
FIG. 3 is a top plan view of the turf laying apparatus.
Figure 4:
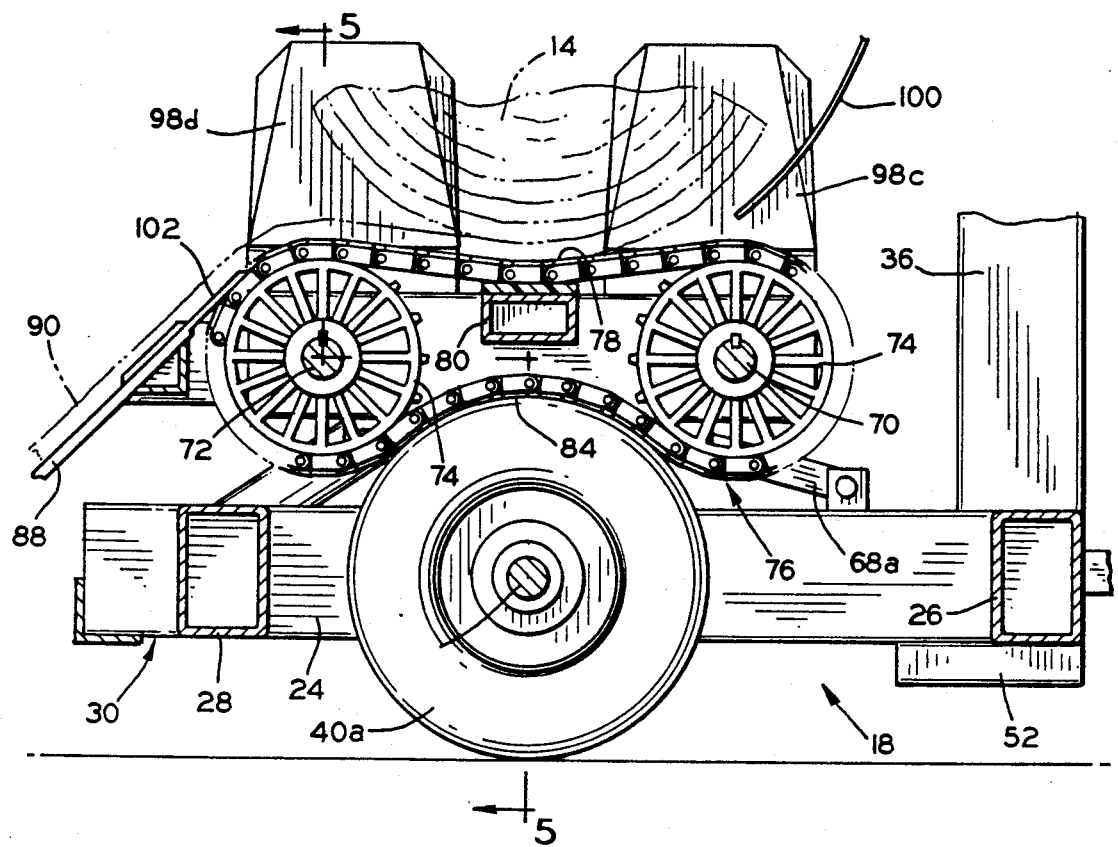
FIG. 4 is an enlarged sectional view of the turf laying apparatus as shown in FIG. 2.

The frame 18 is supported by four wheels 40a, 40b, 40c and 40d mounted on axle 42. The frame 18 as shown in FIG. 2 is adapted to accommodate three drive means. The frame 18 may be hitched to a three point draw bar lift assembly as conventionally provided upon present day tractors. With slight modification, the frame work can also be used with a conventional two point or other tractor hitch mechanism. More particularly, the frame 18 has lower braces 44 and 46 mounted on the front cross-beam 26 and a bracket 48 extending frontwardly from the upper cross-beam 38.

Lifting channels 50 and 52 are mounted on the lower surface of front cross-beam 26 to provide a means for driving the frame 18. Lifting channels 50 and 52 are rectangular in shape with an opening towards the front of frame 18. Fork-lift devices are often used in turf laying operations to move rolls or pallets of turf into the proper position. These lifting channels 50 and 52 are positioned on the front cross-beam 26 to match the spacing on the lifting arms of a standard fork lift device.

The third means for driving frame 18 is a hydraulic motor 54 or other pressure fluid actuated motor mounted on the side beam 22. A hydraulic power system (not shown) can be connected to hydraulic motor 54 to drive the turf laying machine 10. The hydraulic motor drive shaft 56 rotates causing the belt drive system 58 to rotate axle 42 of the frame 18.

The conveyor means 16 is mounted on frame 18 includes a frame having two parallel spaced apart side beams 62 and 64. Two pivotally mounted link arms 66a and 66b are connected in parallel to the bottom of the conveyor frame side beam 62 and to the top of side beam 22 of the frame 18. Pivotally mounted link arms 68a and 68b are similarly mounted on the bottom of conveyor side beam 64 and the top of side beam 24.

Two spaced apart conveyor shafts 70 and 72 extend between conveyor frame side beam 62 and conveyor frame side beam 64. The conveyor shafts 70 and 72 are generally parallel to axle 42 and are spaced such that a vertical plane along axle 42 is approximately midway between the conveyor shafts 70 and 72. A plurality of rotatable sprocket wheels 74 are mounted on the conveyor shafts 70 and 72. The outer edges of the sprocket wheels 74 extend beyond the top and bottom surfaces of the conveyor frame side beams 62 and 64.

An endless conveyor 76 engages the sprocket wheels 74 mounted on the conveyor shafts 70 and 72. A generally planar surface 78 is formed on the top section of the endless conveyor 76 to support the roll of turf 14. A center support beam 80 mounted between the two conveyor frame side beams 62 and 64 helps support the weight of the roll of turf 14 resting on the top planar surface 78. It has been found that satisfactory results may be obtained by utilizing an endless conveyor formed of a plurality of pivotally interconnected chain-links, as illustrated clearly in FIGS. 3 and 4.

A pressure fluid actuated motor 82a has one end mounted on side beam 22 and the other end mounted on the conveyor frame side beam 62. A pressure fluid actuated motor 82b is similarly connected to side beam 24 and conveyor frame side beam 64. The motors 82a and 82b, pretypically hydraulically actuated are employed to raise and lower the conveyor frame 60 and the conveyor means 16. As the conveyor frame 60 is raised and lowered, the link arms 66a, 66b, 68a, and 68b pivot on the respective mounting brackets to provide support and stability to the conveyor means 16.

When the conveyor means 16 is fully lowered, the bottom surface 84 of the endless conveyor 76 engages the peripheral out surfaces of the wheels 40. As frame 18 is moved over the ground 20, the frictional engagement of the wheels 40 with the bottom surface 84 causes the endless conveyor 76 to be driven about the sprocket wheels 74 rotating on conveyor shafts 70 and 72.

The movement of the endless conveyor 76 causes the roll of turf 14 to rotate about a supporting spindle 86. As the roll of turf 14 rotates, the outer end of the roll of turf 14 is discharged from the endless conveyor 76 to a discharge chute 88 mounted at the rear of the conveyor means 16. The unrolled turf 90 slides down the discharge chute 88 as the roll of turf 14 is being unwound. The discharge chute 88 extends downwardly from the conveyor means 16 and the unrolled turf 90 slides down the discharge chute 88 to engage the ground 20 at the lower end of the discharge chute 88.

When the hydraulic motors 82a and 82b are extended to raise the conveyor frame 60, the endless conveyor 76 ceases frictional engagement with the wheels 40. The turf laying machine 10 can be moved to a desired position by driving frame 18 on wheels 40 without unrolling the roll of turf 14.

A pressure fluid actuated motor 92 is mounted on the conveyor frame side beam 62 to rotatably drive conveyor shaft 70. The use of hydraulic motor 92 permits the endless conveyor 76 to be rotated in either direction to wind or unwind the roll of turf 14.

The hydraulic power source used to power the frame hydraulic motor 54, the hydraulic motors 82a and 82b, and the conveyor frame hydraulic motor 92 is supplied by the pulling vehicle 12 or by an independent hydraulic power means (not shown). Hydraulic power hoses 94 are mounted on the upper cross beam 38 at the front of the frame 18. The toggle controls 96 are also mounted on the upper cross beam 38 and are used to operate the various hydraulic systems. Only a portion of the hydraulic power hoses 94 are shown in the drawings. Instead of obtaining hydraulic power from a vehicle 12, a conventional gasoline motor with a hydraulic pump could be used to power the hydraulic systems.

The conveyor means 16 is provided with side shields 98a, 98b, 98c, 98d extending vertically along the side edges of endless conveyor 76. The side shields 98a and 98b are flange-mounted and bolted to conveyor frame side beam 62. The side shields 98c and 98d are similarly mounted to conveyor frame side beam 64. The side shields 98 help keep the roll of turf 14 in proper alignment on the top planar surface 78 of the endless conveyor 76. A front shield 100 is mounted between the side shields 98a and 98c to prevent the turf and other debris from being discharged towards the front of the turf laying machine 10.

A pair of support arms 104 mounted on side posts 32 and 34 are affixed at either end of the spindle 86 in the center of the roll of turf 14. The support arms 104 assist assuring proper rotation of turf roll 14 about the spindle 86 as the unrolled turf 90 is being discharged.

A cleaning mechanism 102 may be attached to the top end of the discharge chute 88 adjacent to the endless conveyor 76. The cleaning mechanism 102 has a plurality of comb-like teeth which extend between the links of the endless conveyor 76. As the endless conveyor 76 is driven about the sprocket wheels 74, the teeth of the cleaning mechanism 102 dislodge any mud or other debris which may have collected on the endless conveyor 76 and direct such mud and debris down the discharge chute 88 to the ground 20. The endless conveyor 76 must be kept clean to insure proper frictional engagement between the endless conveyor 76 and the wheels 40 to move the endless conveyor 76. In addition, the cleaning mechanism 102 insures a proper feed of the roll of turf 14 from the endless conveyor 76 to the discharge chute 88.

In operation, the turf laying machine 10 is transported to the desired location for laying the rolls of turf 14. A fork lift is also typically used at the job sights. Instead of delivering skids of rectangular pieces of turf from a truck to the desired location at the job sight, the fork lift is used to deposit a turf roll 14 in the proper position on the endless conveyor 76.

After the roll of turf 14 is in position and the support arms 104 have been attached, the turf laying machine 10 is then powered over the ground 20 by a pulling vehicle 12 or other power means. As the wheels 40 of the frame 18 rotate, the endless conveyor 76 moves about the sprocket wheels 74 of the conveyor means 16. The unrolled turf 90 is guided down the discharge chute 88 to the appropriate position for placement on the ground 20.

Figure 5:
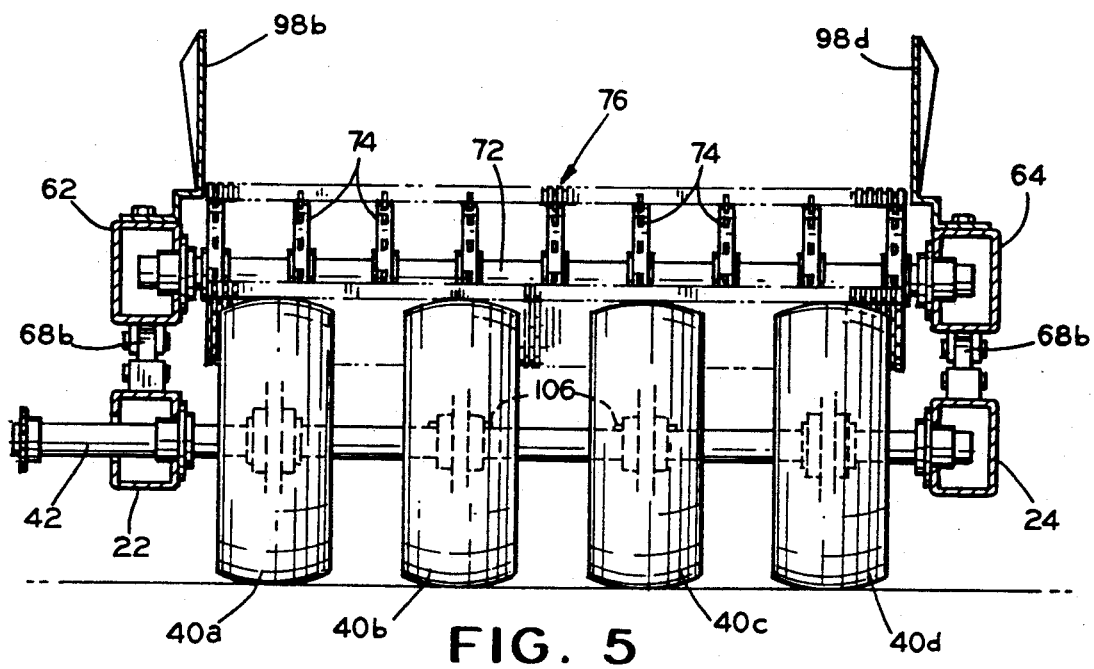
FIG. 5 is a sectional view taken on line 5—5 of FIG. 4.

FIG. 5 shows the axle 42 on the frame 18 with four wheels 40a, 40b, 40c, and 40d mounted on the axle 42. To facilitate the turning of the turf laying machine 10 during normal turf laying operations, the two outer wheels 40a and 40d may be permitted to "free wheel" on axis 42. The two inner wheels 40b and 40c are keyed 106 to axle 42 to drive the frame 18 and facilitate the most efficient turning operation for the turf laying machine 10.

Figure 6:
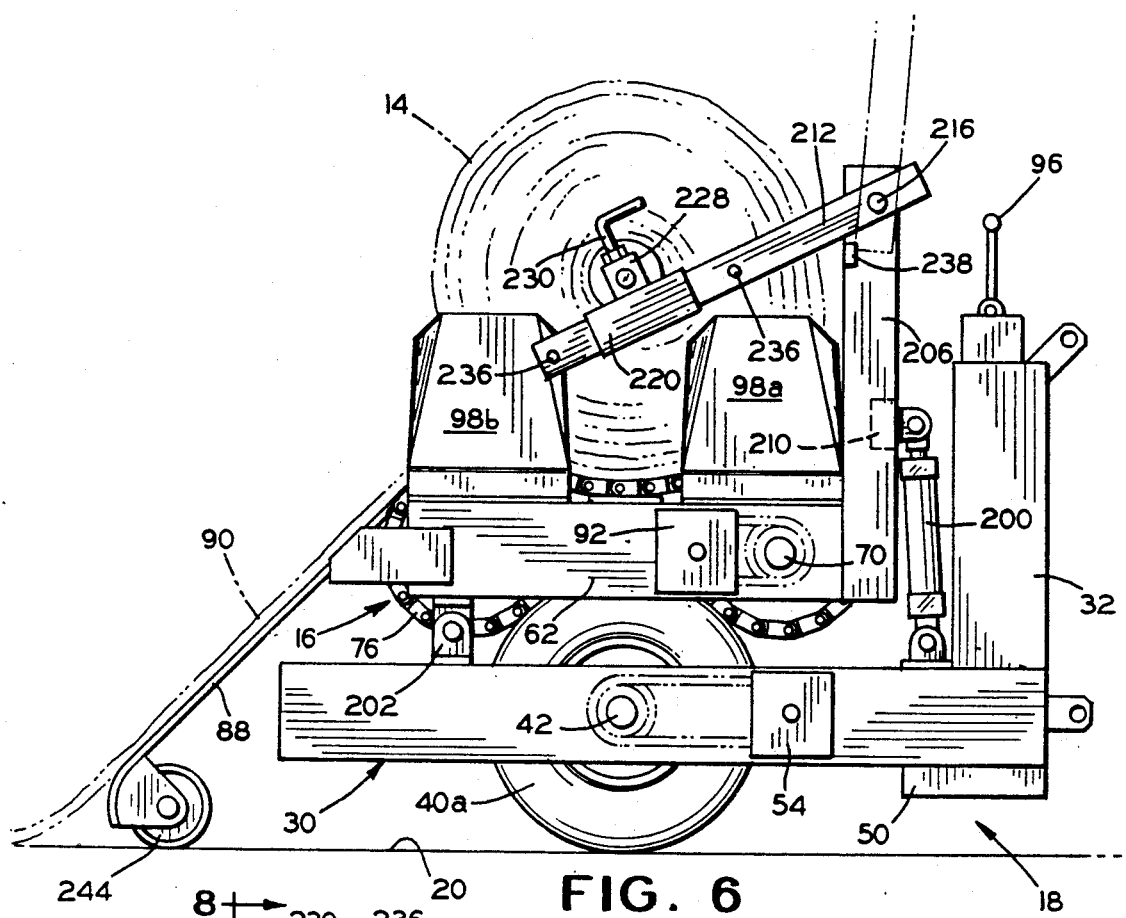
FIG. 6 is a side elevational view of an alternative embodiment of the turf laying apparatus shown in FIGS. 1-5.
Figure 7:
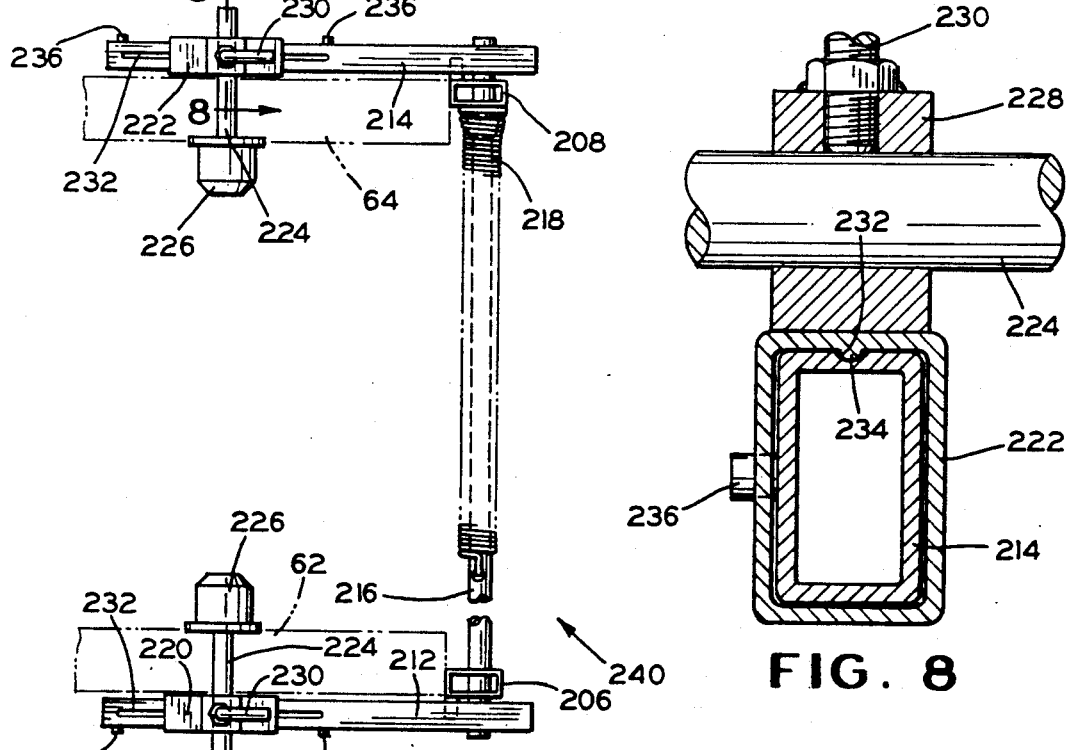
FIG. 7 is a top plan view of the turf laying apparatus illustrated in FIG. 6.
Figure 8:
FIG. 8 is a sectional view taken on line 8—8 of FIG. 7.

In FIGS. 6, 7, and 8, there is illustrated an alternative embodiment of the present invention. Similar reference numbers are used to designate similar structural parts of the embodiment illustrated in FIGS. 1 to 5, inclusive. The conveyor means 16 is pivotally mounted to the frame 18 by suitable spaced apart pivotal mountings 202. The conveyor means 16 may be moved about the pivotal mountings 202 by a pressure fluid actuated motor 200. It will be appreciated that the pivotal mountings 202 typically include two spaced apart units which pivotally interconnect the side beams 62 and 64 of the conveyor means 16 to the respective side beams 22 and 24 of the base 30.

A pair of spaced apart beams 206 and 208 extend upwardly from the conveyor means 16. A cross beam 210 extends between the beams 206 and 208.

The hydraulic motor 200 is pivotally mounted to extend between the frame 18 and the cross beam 210 of the conveyor means 16. The conveyor means 16 is caused to pivot about the pivotal mountings 202 by the introduction of pressure fluid into or out of the motor 200. It will be understood that normally the conveyor 76 is positioned to engage the wheels 40 and may be disengaged from the wheels 40 by upward pivotal movement of the conveyor means 16.

Support arms 212 and 214 are mounted on a shaft 216 extending between the beams 206 and 208. A helical spring 218 is mounted on shaft 216 to provide assistance in raising the support arms 212 and 214 to facilitate the loading of a new roll of turf 14.

Sleeves 220 and 222 are slidably mounted on the support arms 212 and 214, respectively. A spindle 224 and a spindle head 226 are adjustably mounted through a bracket 228 affixed to each of the sleeves 220 and 222. A securing bolt 230 is threadably received by the bracket 228 and is adapted to engage the spindle 224 to lock the same in place. The spindle 224 can be easily adjusted when positioning a roll of turf 14 on the upper conveyor surface 78. The rolls of turf 14 are typically wound on tubes formed of a polyvinyl chloride or other suitable material. The spindle heads 226 are received within the respective ends of the turf roll supporting tubes and are adapted to rotate with the associated rolls of turf 14 about the spindle heads 226.

The upper surfaces of support arms 212 and 214 are each provided with respective grooves 232. The upper portions of the inner surfaces of the sleeves 220 and 222 are provided a depending guide rib 234 adapted to slide within the respective grooves 232 of the support arms 212 and 214. The sleeves 220 and 222 are adapted to slide on the support arms 212 and 214 between outwardly projecting spaced apart stop members 236.

When a roll of turf 14 is completely unwound, the spindle heads 226 are removed from the tube by loosening the securing bolts 230. The support arms 212 and 214 may then be raised until the respective inner ends contact stops 238 secured to the respective beams 206 and 208. After a new roll of turf 14 is in place, the support arms 212 and 214 are lowered and the sleeves 220 and 222 are moved until the spindle heads 226 can be inserted into the ends of the tube on which the new roll of turf 14 is wound. The securing bolts 230 are tightened to lock the spindles 224 in place.

As the roll of turf 14 unwinds, buckles will periodically occur in the turf which are caused by slack in the roll of turf 14 and other factors in working with large rolls of turf. Since buckles in the turf on the ground 20 are not acceptable, the apparatus may be adjusted or manual operations may be performed to remove the buckles from the turf. While it is not clearly understood, the formation of the buckles are minimized to a significant extent by the sliding action of the sleeves 220 and 222 on the respective support arms 212 and 214. When a buckle occurs, it is believed that sliding action allows the roll of turf 14 to move axially of the apparatus and the buckles are drawn out by the conveyor 76 before the buckles are discharged down the chute 88 to the ground 20.

Another function of the sleeves 220 and 222 and respective support arms 212 and 214 is to effect proper alignment of the turf roll. Even if the roll of turf 14 is not aligned parallel to the axle 42 of frame 18 when placed on the upper conveyor surface 78, the spindle heads 226 can be secured and the roll of turf 14 is moved to preferred alignment once the conveyor 76 moves to unwind the roll of turf 14.

When the turf 90 is especially heavy due to moisture content, for example, an elongated roller 244 may be mounted to the lower end of the discharge chute 88 to maintain a clearance with the ground 20. In addition to supporting the discharge chute 88, the roller 244 tends to smooth the ground 20 prior to the application of the newly introduced turf 90.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for laying turf comprising:
   a) a frame;
   b) an axle attached to said frame;
   c) ground engaging wheel means mounted on said axle for supporting said frame above the ground;
   d) means for imparting rotational movement to said ground engaging wheel means; and
   e) an endless conveyor provided with a guide means and mounted on said frame for supporting a roll of turf, said endless conveyor frictionally engaging said ground engaging wheel means whereby the rotation of the ground engaging wheel means imparts movement to said endless conveyor and directs an outer end of the roll of turf over the guide means toward the ground.

2. The apparatus for laying turf defined in claim 1 including bracket means mounted on said frame for selective attachment to a pulling vehicle.

3. The apparatus for laying turf defined in claim 1 including channel means mounted on said frame for receiving a fork of a fork lift vehicle.

4. The apparatus for laying turf defined in claim 1 wherein said means for imparting rotational movement to said ground engaging wheel means includes pressure fluid actuated motor means.

5. The apparatus for laying turf defined in claim 1 including a plurality of sprocket wheels supporting said endless conveyor.

6. The apparatus for laying turf defined in claim 1 including means for raising and lowering said endless conveyor whereby said endless conveyor may selectively disengage said ground engaging wheel means to stop movement of the endless conveyor or engage said ground engaging wheel means to impart movement to said endless conveyor.

7. The apparatus for laying turf defined in claim 6 wherein said means for raising and lowering includes a pressure fluid actuated motor.

8. The apparatus for laying turf defined in claim 1 including an independent drive means mounted on said frame for imparting movement to said endless conveyor.

9. The apparatus for laying turf defined in claim 8 wherein said independent drive means for imparting movement to said endless conveyor includes pressure fluid actuated motor means.

10. The apparatus for laying turf defined in claim 1 including at least two upwardly extending spaced apart side supports mounted on said frame for supporting an outer end of the roll of turf on said endless conveyor.

11. The apparatus for laying turf defined in claim 1 including a shield mounted on said frame for supporting a longitudinal surface of the roll of turf on said endless conveyor.

12. The apparatus for laying turf defined in claim 1 wherein said guide means includes a discharge chute attached to said frame to guide the outer end of the roll of turf downwardly.

13. The apparatus for laying turf defined in claim 12 including a cleaning mechanism forming a plurality of teeth extending in the spaces between adjacent ones of said links.

14. The apparatus for laying turf defined in claim 1 wherein said endless conveyor is formed of a series of interconnected links.

15. The apparatus for laying turf defined in claim 1 including a pair of support arms for rotatably supporting the roll of turf, said support arms having a first end pivotably connected to said frame and a second end slidably connected to the roll of turf.

16. The apparatus for laying turf defined in claim 15 including spring means for biasing said support arms to pivot about said first end, said support arms pivoting away from the roll of turf when the second end is disconnected from the roll of turf.

17. The apparatus for laying turf defined in claim 1 wherein said endless conveyor includes a base, said base having a first end pivotally connected to said frame and a second end connected to a pressure fluid actuated means mounted on said frame for raising said endless conveyor to disengage said ground engaging wheel means.

18. An apparatus for laying turf, comprising:
   a) a frame;
   b) an axle attached to said frame;
   c) ground engaging wheel means mounted on said axle for supporting said frame above the ground;
   d) means for imparting rotational movement to said ground engaging wheel means; and
   e) an endless conveyor mounted on said frame for supporting a roll of turf;
   f) means for raising and lowering said endless conveyor whereby said endless conveyor may be selectively positioned to frictionally engage or disengage said ground engaging wheel means whereby the rotation of the ground engaging wheel means when the endless conveyor is engaged imparts movement to said endless conveyor and directs an outer end of the roll of turf over a discharge chute and toward the ground; and
   g) additional means for rotating said endless conveyor whereby said endless conveyor rotates independently when said endless conveyor is disengaged from said ground engaging wheel means.

* * * * *